Aug. 7, 1934. R. T. POOLE 1,968,910
DRYING APPARATUS AND METHOD
Filed July 20, 1929 3 Sheets-Sheet 1
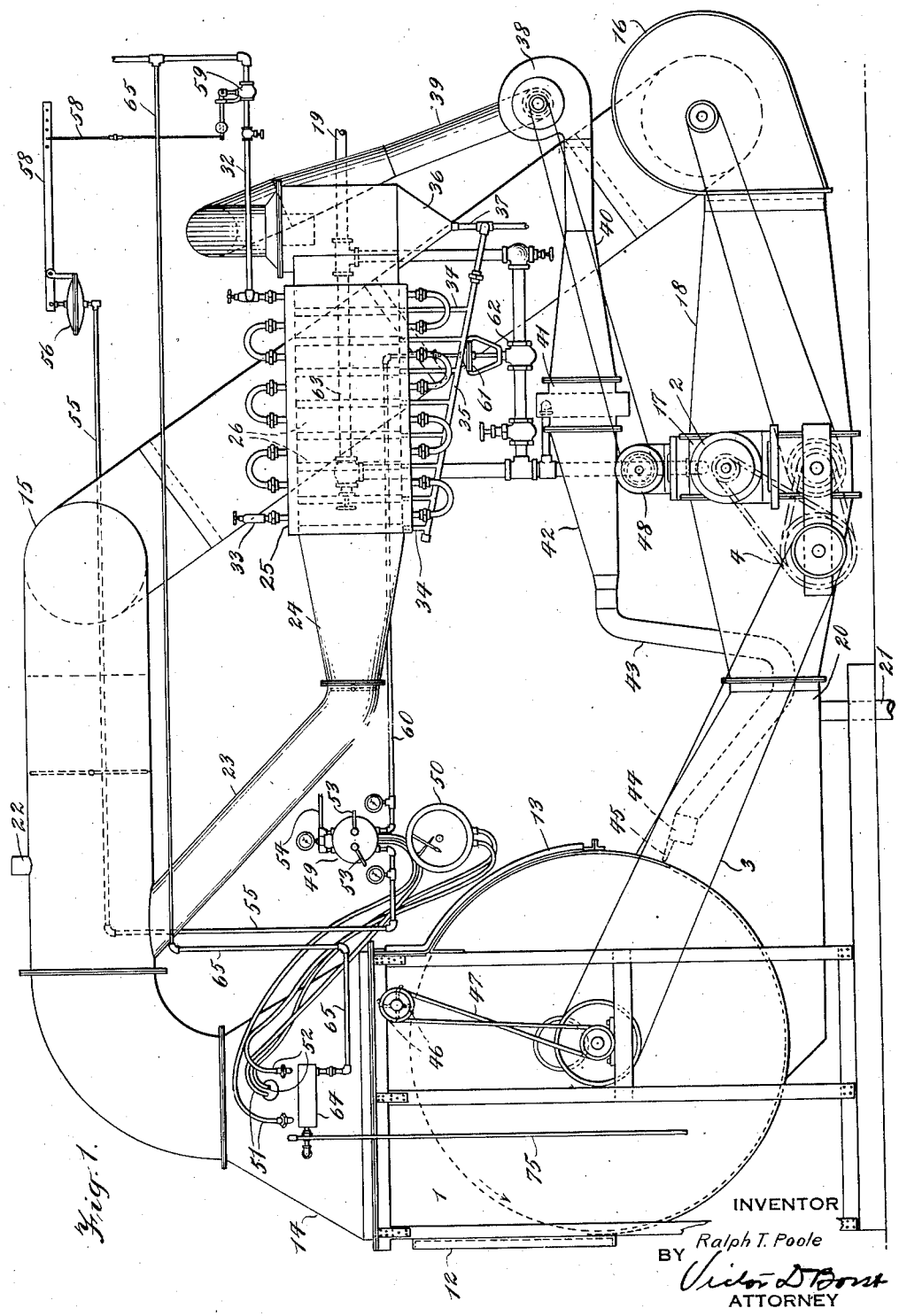
INVENTOR
Ralph T. Poole
BY
ATTORNEY Aug. 7, 1934.     R. T. POOLE     1,968,910
DRYING APPARATUS AND METHOD
Filed July 20, 1929     3 Sheets-Sheet 2
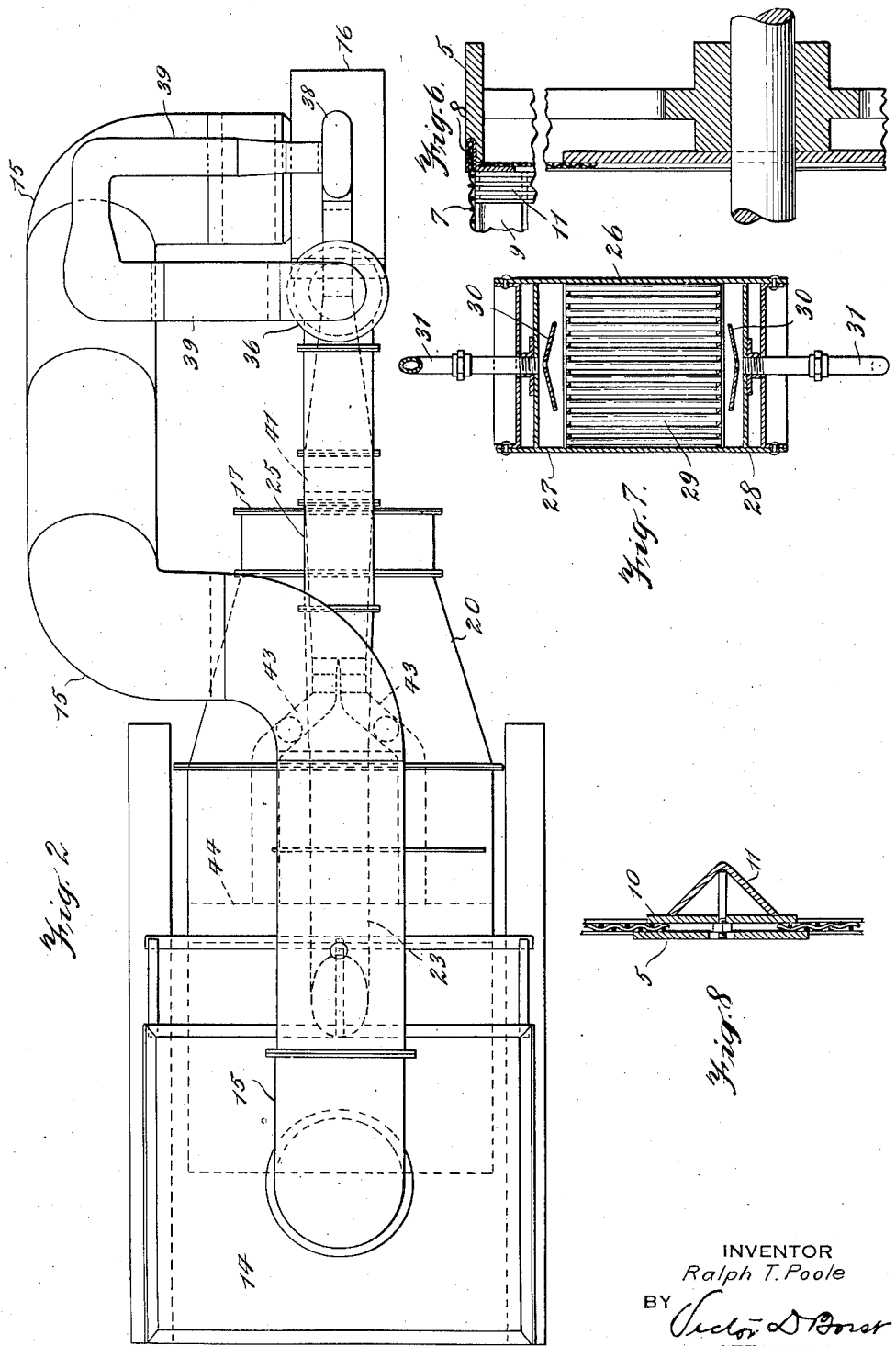
INVENTOR
Ralph T. Poole
BY
ATTORNEY

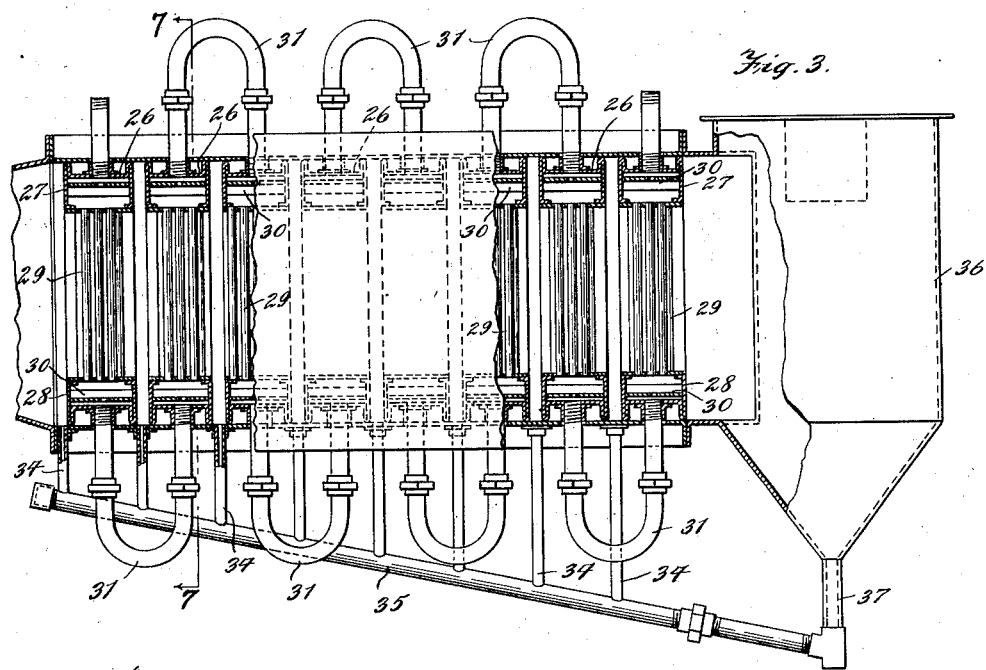
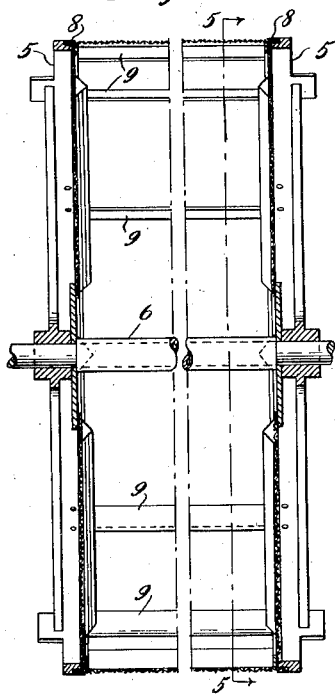
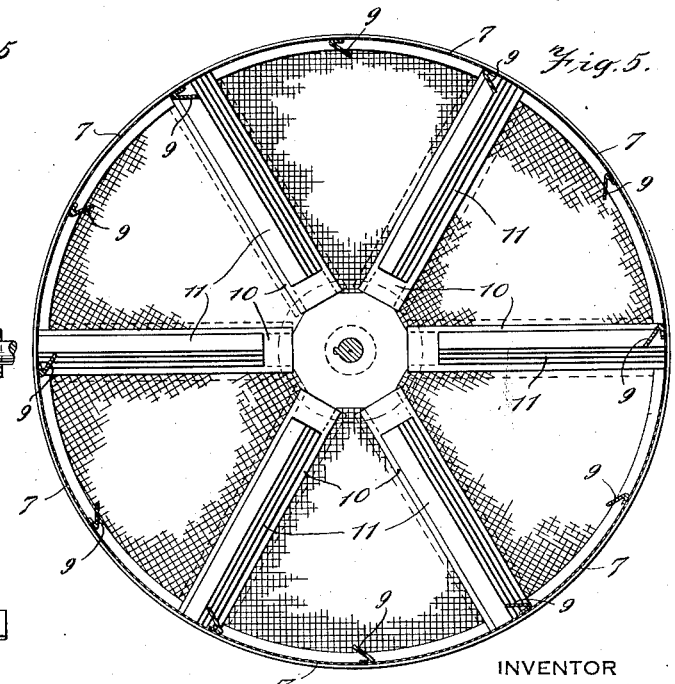

Patented Aug. 7, 1934

1,968,910

UNITED STATES PATENT OFFICE 1,968,910

DRYING APPARATUS AND METHOD

Ralph T. Poole, Ridgefield Park, N. J., assignor to Spinach Products Company, Inc., a corporation of New Jersey Application July 20, 1929, Serial No. 379,718

3 Claims. (Cl. 34—3)

This invention relates to the art of drying and in its more salient aspects it has an especial utility in closed circulatory systems, although as a method it is in certain respects independent of the particular system employed. Among the principal purposes of the invention are the effecting of economies and the effecting of complete control in drying. Broadly the invention is applicable to the drying of organic materials in general, but one phase of the method has application only to those vegetable substances the internal cells of which are easily collapsible.

With many substances care must be taken that the drying shall not proceed too rapidly in order to prevent an initial hardening of the surface and the entrapping of the internal moisture. With mechanical dryers the drying atmosphere should be maintained at the optimum moisture absorbing capacity at the successive stages of drying. This means that not only must the temperature be regulated but provision must be made to maintain a certain minimum humidity of the atmosphere. It is common practice, therefore, to introduce moisture in the form of a spray or otherwise into the circulating gaseous medium or atmosphere before it passes in contact with the material being dried. With a closed system this obviously adds to the cost of drying since the moisture thus introduced must be eventually removed by condensation.

One of the advantages of this invention is the fact that the proper humidity of the drying medium is maintained by moisture taken from the material being dried. To this end the invention contemplates the by-passing of a portion of the drying medium from the main circulation and the extraction of moisture therefrom as much as is necessary to maintain the proper degree of humidity of the drying medium. In this way the need is avoided of reducing the temperature of the entire medium to the dew point and again raising it to the proper moisture absorbing capacity.

It is within the contemplation of the invention to control the moisture absorbing capacity of the drying medium automatically. For example, wet and dry bulbs may be used to control the condensation of moisture from the by-passed portion of the drying medium and the temperature of the drying medium. The setting of these bulbs will be varied from time to time as the drying progresses and they will be in control of the condenser and the heater. Preferably heaters of proper relative capacity will be located in both the main circulatory passage and the by-pass, and a common valve may control the admission of steam or other heating agent to both heaters, although a separate dry bulb in the by-pass may control that heater independently of the main heater. The temperature of the condenser in the by-pass will be controlled by the wet bulb so as to effect the condensation to the optimum extent.

The specific use to which I have put this invention is the drying of a food product as a preliminary step in the preparation of a concentrated food. I have found that the invention is especially efficacious in the retention of the essential food elements. For example, I have used it in the drying of spinach preliminary to reducing it to powdered form, and by way of illustration the invention will be described in its application to the drying of spinach. With spinach and similar products in accordance with my invention I reduce considerably the time required for the drying by first freezing the product and then drying it. Such refrigeration does not injuriously affect the product, but it results in breaking down the internal cells of the product and causing it to give up a considerable portion of the water entrapped therein before the product is introduced into the dryer.

In this respect, therefore, the invention as a method contemplates two steps, namely, first a freezing and then a drying of the product. The spinach or other product after being thoroughly washed, is frozen solid in a refrigerator, and the moisture in the internal cells on freezing breaks the internal cellular structure. The frozen spinach is then thawed and re-washed, the washing serving to expedite the thawing, and a centrifuge is then advantageously employed to throw off all the loose or surface water. The spinach is then thoroughly dried.

This drying operation is carried on in a closed system and the drying agent is some inert gas, such, for example, as carbon dioxide, although it will be understood that in products where harmful oxidation is not liable to occur, ordinary atmosphere may be employed. Within the casing, a large drum of foraminous material, which is adapted to hold the charge of spinach, is rotatably mounted. The drum is driven by a motor and rotates within the housing at a slow rate. A duct leading to the intake end of a blower communicates with the housing surrounding the drum at the upper end thereof. A second duct leading from the exhaust end of the blower and communicating with the lower end of the drum housing contains a heater which serves to heat the drying agent in its passage from the blower to the drum. The pressure within the system is maintained slightly above atmospheric pressure so as to exclude the atmosphere. In accordance with the invention this is done by the gas pressure itself. The gas is admitted at the intake under slight pressure just in advance of the drum, and a relief valve is provided in an outlet port just behind the drum, this valve being set to maintain the desired pressure in the system. At the beginning the inlet valve for the gas is opened and the drying apparatus is started in operation. The gas expels the atmosphere through the relief valve and in a short time the drying medium is virtually pure gas with a negligible amount of atmosphere mixed therewith.

A branch duct, which has a suitable blower therein to induce circulation, communicates with the duct leading from the upper end of the drum housing. The gas taken from the main duct through this branch duct is led through a condenser where it is cooled to the dew point and deposits some of its moisture more or less continuously as conditions determine. On leaving the condenser, the gas is delivered to a centrifugal separator which separates the entrained moisture which was not deposited in the condenser. From the separator, the gas is blown through a heater by means of which the gas in this branch circuit is reheated to the necessary extent. The duct leading from the heater divides into two ducts of lesser diameter which pass through the main duct and communicate with a header that has a nozzle in close proximity to the rotating drum. The nozzle extends across the entire width of the drum and the velocity of the gas ejected therefrom serves to remove adhering material. In addition to the nozzle there is a mechanical tapper for this purpose. The rate of condensation and the temperature, the two elements which determine the humidity or moisture absorbing capacity of the circulating gas, are automatically controlled, as above explained. The regulating apparatus may be set to the desired wet and dry bulb temperature and the instrument will thereafter maintain that degree of humidity and of temperature until a different setting is made. The settings are varied from time to time as the drying progresses.

Other features and advantages of my invention will hereinafter more particularly appear.

I shall now describe the invention in connection with the apparatus illustrated in the accompanying drawings, in which:

Fig. 1 is a side elevation of an apparatus used in carrying out my invention;

Fig. 2 is a plan of the same;

Fig. 3 is a side elevation of the condenser with parts broken away to show the structure;

Fig. 4 is a diametrical section of the foraminous covered drum which holds the charge;

Fig. 5 is a transverse section of the drum taken on the line 5—5 of Fig. 4;

Fig. 6 is an enlarged fragmentary section of the drum showing the means for attaching the foraminous material thereto;

Fig. 7 is a section of the condenser taken on the line 7—7 of Fig. 3, and

Fig. 8 is an enlarged fragmentary section of a spoke on one side of the drum showing the means for attaching the foraminous material thereto.

The following detailed description will be given with reference to the preparation of spinach in the concentrated form. It is, however, to be understood that the invention is not limited to the treatment of spinach but is also applicable to other products.

In the preparation of spinach, the spinach is first frozen solid in any suitable freezing apparatus. The frozen spinach is then thawed, a washing operation being performed during the thawing. The effect of the freezing of the spinach is to break down the internal cellular structure therein by the expansion of the moisture entrapped therein. After the cellular structure has been broken down, the washing water, during the thawing, carries with it a considerable quantity of the moisture formerly entrapped by the internal structure of the spinach. The breaking down of the internal cellular structure also has the desirable effect of opening the entire internal structure of the spinach to the drying agent in the mechanical dryer, thereby materially reducing the time required for removing the moisture in the spinach left after the freezing and thawing thereof. After the spinach has been frozen, thawed and centrifugally dried it is placed in a mechanical dryer where the remaining moisture is completely removed.

A suitable mechanical dryer for completing the drying operation is shown, by way of illustration, in the drawings. The dryer illustrated embodies novel features and advantages which will particularly appear during the following detailed description thereof. Essentially, the dryer consists of a closed system comprising a main circuit and a branch circuit. The main circuit contains, in the order mentioned, a drying chamber, a blower and a heater. The branch circuit, which is tapped into the main circuit behind the dryer relative to the direction of movement of the drying agent, contains a condenser, centrifugal separator, blower and heater. The humidity of the drying agent is maintained by automatic controls.

Within a drying chamber 1, a large drum of foraminous material is rotatably mounted. The drum is driven in a counter-clockwise direction, as viewed in Figure 1, by a motor 2 through a belt 3 and intermediate reduction gearing 4. The drum comprises two side spiders 5 spaced apart by a spacer 6, the periphery of the drum being formed by a plurality of screen sections 7. The side edges of the peripheral screens are covered by a binding strip 8 which is bent around the edge thereof. The binding strip is drilled to receive machine screws by means of which the screens are attached to the periphery of the spiders 5. Each screen section extends between the center lines of adjacent spokes of the spiders. In the form shown, there are six screen sections, constituting the periphery of the drum. On the inner surface, each section carries, secured thereto, two deflector angle members 9 running lengthwise of the inner face of the drum. The deflector angle members serve as agitators and elevators carrying the material up to a point where it falls off by the action of gravity, and they also serve to keep the material from clogging the screen. The sides of the drum between the spokes of the spiders 5 are also covered with screen material as shown. The ends of the side screen sections are clamped between the spokes of the spiders 5 and a plate 10 provided therefor. The plate 10 also serves as a base for a V-shape baffle or deflector 11 which extends longitudinally of the spoke and serves to deflect the material in the drum from clogging the side screens. All of the peripheral sections of the drum are detachably secured to the spider and any one may be removed for charging and recharging the dryer, a door 12 being provided in the rear wall of the drying chamber for that purpose. A removable cover 13 is also provided in the opposite wall of the drying chamber for cleaning and other purposes.

From the drying chamber, the drying agent is drawn through a hood 14 to a duct 15 which is connected to the intake end of a large blower 16. The blower 16 serves to maintain the circulation of the drying agent which, in the case of spinach, is some inert gas, and the gas pressure maintains the pressure in the system slightly above atmospheric pressure in order positively to exclude the surrounding atmosphere. In drying spinach, an inert gas is used in the system to prevent oxidation of the product, but where oxidation of the product is not liable to occur, ordinary atmosphere can be employed.

The exhaust end of the blower 16 communicates with a heater 17 through a duct 18. The heater 17 is simply a series of steam radiator coils between which the drying agent passes and which are supplied with steam by the supply pipe 19. From the heater, the drying agent is led through a duct 20 to the under side of the drying chamber, the width of the duct being substantially the full length of the drum and its mouth opening over approximately a quadrant of the drum. An inlet 21 for supplying inert gas to the system is provided in the intake duct 20, and an outlet 22, having a pressure relief valve, is provided in the duct 15.

The duct 15 is tapped on the under side to supply the branch circuit of the system. That portion of the drying agent taken from the main circulation is conveyed through a duct 23 to a hood 24 which communicates with the core of a condenser 25. The condenser consists of a plurality of sections 26, each section comprising an upper and lower header 27 and 28 respectively between which a series of cooling coils 29 extend. Each header is provided with a baffle 30 which serves to distribute the cooling water to the various coils. The various sections are connected in series by U-shape conections 31. The cooling water enters through the supply pipe 32 into the first section from which it is delivered to the next section and so on to the exhaust pipe 33. Between each section of the condenser, a space is provided for draining the moisture deposited by the drying agent. The deposited moisture flows to the bottom of the condenser into bleeder pipes 34 which communicate with the bottom of the condenser between the sections. The bleeder pipes are connected to an inclined pipe 35 which carries away the water of condensation.

From the condenser, the drying agent in the branch circuit is delivered to a centrifugal separator 36 which has curved vanes therein (not shown) that cause the flowing gas to assume a swirling motion and removes the entrained moisture which was not deposited in the condenser. The separator is a standard device the action of which is well known to those skilled in the art. The water so separated is drawn off through a pipe 37 which is connected to the condenser drain 35.

The drying agent is led from the separator to the intake end of a small blower 38 through a duct 39. A duct 40, communicating with the exhaust end of the blower 38, leads the gas to a small heater 41 which is similar in construction to the large heater 17 and is supplied from the same steam line. The gas is then led through a hood 42 to two small ducts 43 which enter the large intake duct 20 at the point shown and communicate with a header 44 adjacent the foraminous drum. The header is positioned close to the drum as shown and is provided with a nozzle 45 the mouth of which is in close proximity to the surface of the drum. The gas ejected through the nozzle 45 blows against the surface of the screen and assists in removing material adhering thereto. In addition to the nozzle 45, a rotating mechanical tapper 46, which strikes against the surface of the drum, is provided for removing any adhering material. The tapper 46 is driven by a belt 47 which is driven by the shaft of the drum.

The small blower 38 in the branch circuit is driven by a motor 48 and the pressure in the branch circuit is maintained constant by regulating the speed of rotation of the motor 48.

The proper relative humidity of the drying agent is maintained by controlling the temperature and rate of condensation for which a system of automatic control is provided. Without the automatic control of the relative humidity of the drying agent, the device is not practical for commercial production. The control system comprises a valve control mechanism 49 and a recording instrument 50. The valve control mechanism is controlled by a pair of wet and dry bulbs 51 located in the hood 14 leading from the drying chamber. A similar pair of wet and dry bulbs 52, also located in the hood 14, control the recording instrument 50. The valve mechanism 49, which may be set to any desired relative humidity by the handles 53, is supplied with compressed air by the supply pipe 54. A pipe 55 connects the lower end of the valve mechanism with a diaphragm regulator 56 which, through the medium of a lever 57 and tie rod 58, actuates a valve 59 in the condenser supply line 32. A second line 60 leading from the lower end of the valve mechanism 49 communicates with a diaphragm 61 which is directly connected to a valve 62 in the steam line 19 supplying the heaters 17 and 41. A by-pass 63, around the valve 61, is provided for manual control of the heaters in the event of failure of the automatic control.

The control is effected in the following manner: The handles 53 on the valve mechanism 49 are set for the desired relative humidity of the drying agent. In the event that the temperature of the drying agent varies, the dry bulb will actuate a valve in the valve mechanism allowing compressed air to flow into the pipe line 60 (or be released therefrom depending upon whether the temperature rose or fell) actuating the diaphragm regulator 61 which in turn actuates the steam supply valve 62. Likewise, in the event that the moisture content of the drying agent varies the valve 59 will be actuated.

For the purpose of keeping the wet bulbs in the hood moist, a water supply tank 64 is provided. The tank 64 is supplied with water by the pipe line 65 and is equipped with an overflow pipe 66. The operation of the device is as follows:

The door 12 of the drying chamber is opened, and a section of the screen covering the drum is removed. The spinach to be dried is placed inside the drum and the screen is replaced. The door 12 of the drying chamber is closed and the handles 53 on the valve mechanism 49 are set to maintain the desired relative humidity during the first stage of the drying. The driving motors 2 and 48 are then started and the drying agent caused to circulate by the action of the blowers 16 and 38. The main portion of the drying agent is forced by the large blower 16 through the heater 17 into the lower end of the drying chamber. After passing through the drying chamber, it proceeds through the hood 14 and duct 15 and is delivered to the intake end of the blower 16. After the drying agent has passed over and through the product to be dried, a portion thereof is withdrawn from the main circuit through the duct 23. The portion withdrawn is, if conditions require, cooled in the condenser 25 where it deposits part of its moisture which is drained through the pipe 35. From the condenser, the drying agent in the branch circuit is delivered to the separator 36 where any entrained moisture is removed. The drying agent is then taken in at the intake of the small blower 38 and forced through the heater 41 wherein it is heated to the extent that conditions require. The gas is then delivered through the ducts 42 and 43 to the header 44 and through the nozzle 45 back into the main circuit. From time to time the setting of the handles 53 on the valve mechanism is changed to decrease the humidity of the drying agent until the drying is completed, the relative humidity of the drying agent being maintained in accordance with the setting through the automatic control hereinbefore explained.

In this method, it is to be noted that the proper relative humidity of the drying agent is obtained from the moisture extracted from the product being dried, no extraneous moisture being supplied. Furthermore, the utilizing of a branch circulation, through which a portion of the circulating atmosphere is being continually drawn and moisture extracted therefrom after which it is re-heated and put back into the main circulation, makes unnecessary the cooling down of the entire circulating gas to a condensation point and then the re-heating of all the gas so cooled to a point where it has the proper moisture-absorbing capacity, thereby effecting economy and avoiding wide fluctuations in humidity.

With certain products essential food elements may pass off with the moisture released by freezing or may be present in the condensate from the dryer. When desirable, these elements may be recovered and may be returned in whole or in part to the final product of the drying process or may be used in any other manner. For example, the solids may be recovered by evaporation of the liquid separated by the centrifuge and the volatile constituents may be recovered by distillation.

It is obvious that various changes may be made in the apparatus for carrying out my method above illustrated and particularly described within the principle and scope of my invention as expressed in the appended claims.

I claim:—

1. A dryer consisting of a closed system and comprising in combination a main circuit having a drying chamber therein, a heater in said main circuit in advance of the drying chamber relative to the direction of travel of the drying agent, means for causing the drying agent to flow through said circuit, a branch circuit for removing a portion of the drying agent from the main circuit after it has passed over the material to be dried and returning the portion so extracted in advance of the drying chamber and to the rear of the heater in the main circuit, means in the branch circuit for removing moisture from that portion of the drying agent extracted from the main circuit, and a heater in the branch circuit to the rear of said moisture-removing means for heating the portion of the drying agent passing through the branch circuit.

2. A dryer consisting of a closed system and comprising in combination a main circuit having a drying chamber therein, a foraminous drum rotatably mounted in said drying chamber and adapted to contain the material to be dried, means for rotating said drum, a heater in the main circuit in advance of the drying chamber relative to the direction of travel of the drying agent, means for causing the drying agent to flow through the circuit, a branch circuit for removing a portion of the drying agent from the main circuit after it has passed over the material to be dried and returning the portion so extracted in advance of the drying chamber and to the rear of the heater in the main circuit, a condenser in the branch circuit for condensing moisture carried by that portion of the drying agent passing through the branch circuit, and a heater in the branch circuit mounted to the rear of the condenser relative to the direction of flow of the drying agent through the branch circuit.

3. A dryer consisting of a closed system and comprising in combination a main circuit having a drying chamber therein, a foraminous drum rotatably mounted in the drying chamber and adapted to receive the material to be dried, means for rotating the drum to agitate the material therein, a heater in the main circuit in advance of the drying chamber relative to the direction of travel of the drying agent, means for causing the drying agent to flow through the circuit, a branch circuit for removing a portion of the drying agent from the main circuit after it has passed over the material to be dried, a header adjacent the surface of the drum in the drying chamber and forming an outlet for the drying agent passing through the branch circuit, a condenser in the branch circuit for removing moisture from that portion of the drying agent passing through the branch circuit and a heater in the branch circuit between the header and the condenser.

RALPH T. POOLE.